(12) United States Patent
Roozbeh et al.

(10) Patent No.: US 12,111,768 B2
(45) Date of Patent: Oct. 8, 2024

(54) METHODS AND DEVICES FOR CONTROLLING MEMORY HANDLING

(71) Applicant: Telefonaktiebolaget LM Ericsson (publ), Stockholm (SE)

(72) Inventors: Amir Roozbeh, Stockholm (SE); Alireza Farshin, Stockholm (SE); Dejan Kostic, Solna (SE); Gerald Q Maguire, Jr., Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 178 days.

(21) Appl. No.: 17/427,626

(22) PCT Filed: Feb. 13, 2020

(86) PCT No.: PCT/SE2020/050161
§ 371 (c)(1),
(2) Date: Jul. 30, 2021

(87) PCT Pub. No.: WO2020/167234
PCT Pub. Date: Aug. 20, 2020

(65) Prior Publication Data
US 2022/0100667 A1   Mar. 31, 2022

Related U.S. Application Data

(60) Provisional application No. 62/805,552, filed on Feb. 14, 2019.

(51) Int. Cl.
*G06F 12/00* (2006.01)
*G06F 9/455* (2018.01)
(Continued)

(52) U.S. Cl.
CPC ...... *G06F 12/0871* (2013.01); *G06F 9/45558* (2013.01); *G06F 12/0646* (2013.01);
(Continued)

(58) Field of Classification Search
CPC ............ G06F 12/0871; G06F 9/45558; G06F 12/0646; G06F 12/0811; G06F 12/0846;
(Continued)

(56) References Cited

U.S. PATENT DOCUMENTS 3,979,726 A * 9/1976 Lange ................. G06F 12/0864
                                                711/135
8,738,860 B1   5/2014 Griffin et al.
(Continued)

FOREIGN PATENT DOCUMENTS

EP         3015980 A1    5/2016
WO      2019245445 A1   12/2019

OTHER PUBLICATIONS

International Search Report and Written Opinion for Application No. PCT/SE2020/050161, dated Jun. 11, 2020, 13 pages.
(Continued)

*Primary Examiner* — Shawn X Gu
*Assistant Examiner* — Mohammad S Hasan
(74) *Attorney, Agent, or Firm* — Nicholson De Vos Webster & Elliott LLP

(57) ABSTRACT

A method and device for controlling memory handling in a processing system comprising a cache shared between a plurality of processing units, wherein the cache comprises a plurality of cache portions. The method comprises obtaining first information pertaining to an allocation of a first memory portion of a memory to a first application, an allocation of a first processing unit of the plurality of processing units to the first application, and an association between a first cache portion of the plurality of cache portions and the first processing unit. The method further comprises reconfiguring a mapping configuration based on the obtained first information, and controlling a providing of first data associated with the first application to the first cache portion from the
(Continued)

first memory portion using the reconfigured mapping configuration.

19 Claims, 10 Drawing Sheets

(51) Int. Cl.
    *G06F 12/06*     (2006.01)
    *G06F 12/0811*     (2016.01)
    *G06F 12/0846*     (2016.01)
    *G06F 12/0871*     (2016.01)
    *G06F 12/0873*     (2016.01)

(52) U.S. Cl.
    CPC ...... *G06F 12/0811* (2013.01); *G06F 12/0846* (2013.01); *G06F 12/0873* (2013.01); *G06F 2009/45583* (2013.01)

(58) Field of Classification Search
    CPC ....... G06F 12/0873; G06F 2009/45583; G06F 12/1433; G06F 12/1483; G06F 12/0292; G06F 2212/1052; G06F 2212/152; G06F 12/0284; G06F 2212/601; G06F 12/0842; G06F 12/084
    See application file for complete search history.

(56) References Cited

U.S. PATENT DOCUMENTS

| | | | |
|---|---|---|---|
| 9,009,385 B1 | 4/2015 | Juels et al. | |
| 9,298,383 B2* | 3/2016 | Dai | G06F 9/5016 |
| 9,491,112 B1* | 11/2016 | Patel | G06F 9/45558 |
| 9,767,015 B1 | 9/2017 | McKelvie et al. | |
| 10,552,323 B1* | 2/2020 | Hall | G06F 9/30083 |
| 2002/0038301 A1* | 3/2002 | Aridor | G06F 9/465 |
| 2005/0273486 A1* | 12/2005 | Keith, Jr. | G06F 21/10 |
| | | | 709/200 |
| 2006/0179259 A1 | 8/2006 | Kershaw et al. | |
| 2007/0226417 A1* | 9/2007 | Davis | G06F 12/0802 |
| | | | 711/E12.017 |
| 2010/0235580 A1 | 9/2010 | Bouvier | |
| 2010/0268889 A1* | 10/2010 | Conte | G06F 8/41 |
| | | | 711/170 |
| 2011/0304634 A1 | 12/2011 | Urbach | |
| 2011/0314224 A1* | 12/2011 | Piry | G06F 12/0808 |
| | | | 711/E12.017 |
| 2012/0144092 A1 | 6/2012 | Hsieh et al. | |
| 2014/0006715 A1* | 1/2014 | Saraf | G06F 12/0692 |
| | | | 711/129 |
| 2014/0156813 A1* | 6/2014 | Zheng | H04L 67/10 |
| | | | 709/220 |
| 2015/0113506 A1* | 4/2015 | Wade | G06F 8/61 |
| | | | 717/121 |
| 2015/0212940 A1* | 7/2015 | Fowles | G06F 11/3466 |
| | | | 711/130 |
| 2015/0269077 A1* | 9/2015 | Lee | G06F 12/0891 |
| | | | 711/135 |
| 2015/0309937 A1* | 10/2015 | Yuan | G06F 16/90339 |
| | | | 711/146 |
| 2016/0147656 A1 | 5/2016 | Hower et al. | |
| 2017/0132147 A1 | 5/2017 | Loh | |
| 2017/0286324 A1* | 10/2017 | Taki | G06F 11/20 |
| 2017/0371720 A1* | 12/2017 | Basu | G06F 9/4881 |
| 2018/0025005 A1 | 1/2018 | Cao et al. | |
| 2018/0052630 A1 | 2/2018 | Peng et al. | |
| 2018/0300242 A1* | 10/2018 | Liu | G06F 16/00 |

OTHER PUBLICATIONS

Clementine Maurice et al., "Reverse Engineering Intel Last-Level Cache Complex Addressing Using Performance Counters," 2015, 18 pages.
International Preliminary Report on Patentability, PCT App. No. PCT/SE2020/050161, Aug. 26, 2021, 10 pages.
Supplementary European Search Report and Search Opinion, EP App. No. 20756105.1, Oct. 24, 2022, 7 pages.

* cited by examiner

METHODS AND DEVICES FOR CONTROLLING MEMORY HANDLING

CROSS-REFERENCE TO RELATED APPLICATIONS

This application is a National stage of International Application No. PCT/SE2020/050161, filed Feb. 13, 2020, which claims priority to U.S. Application No. 62/805,552, filed Feb. 14, 2019, which are hereby incorporated by reference.

TECHNICAL FIELD

The proposed technology relates to a method and a device for controlling memory handling in a processing system. Furthermore, a computer program and a computer program product are also provided herein.

BACKGROUND

To greatly simplify, a computer system comprises one or more processing units (PUs), such as central processing units (CPUs), connected to a memory. When two or more independent PUs are included in the processor, the PUs are generally called "cores" and the processor is referred to as a multi-core processor. The PU fetches instructions and data from a specific depository on the processor chip, known as a cache memory, or simply a "cache". A cache comprises very fast Static Random Access Memory (static RAM or SRAM) which is an expensive resource, but enabling rapid access to the stored information. To deal with the cost issue, a computer system's memory is organized in a hierarchical structure, additionally including cheaper and slower memory such as Dynamic RAM (DRAM), generally referred to as the main memory, and non-volatile memory and/or local storage, generally referred to as the secondary memory. In modern processors, the cache is also implemented in a hierarchical manner, e.g., a Layer one cache (L1), a Layer two cache (L2), and a Layer 3 cache (L3)—also known as the Last Level Cache (LLC). The L1 and L2 cache are private to each core while the LLC is in often shared among all PU cores. The processor keeps recently used data in the cache to reduce the access time to the data. When the requested data is not available in any level of the cache, the data will be loaded from the main memory into the PU cache.

In some processor architectures, the LLC is divided into multiple portions, so called slices. The PUs and all LLC slices are interconnected, e.g., via bi-directional ring bus or mesh, and hence all slices are accessible by all PUs. The particular slice in which a main memory location is cached, i.e., in which slice a copy of an instruction or data stored in the main memory is placed, is in many cases determined by applying an algorithm to the physical address, or part of the physical address, of the main memory location. For example, when the requested data has been found in the DRAM, a number of bits of the physical address may be used as input to a hash function and the output of the function defines which slice in the LLC the data is copied to. The function performing the selecting of slices may be referred to as a slice selection function. A PU can then access and fetch the required instruction or data in the selected slice by use of the interconnect.

Cloud systems for storing data and performing computational tasks have evolved rapidly over the last years. Providers of cloud services strive to optimize utilization of the available hardware resources, such as CPUs, memory, etc., by using intelligent schemes for allocating the resources necessary for satisfying the customer's demands. For instance, setting up an appropriate Virtual Machine (VM) for a task may require allocating a specified number of processing units, a specified memory volume, and other resources, which have to be selected based on, e.g., their locality, capacity, access properties, and the allocation must in addition be coordinated with the resource allocation of other VMs in the cloud environment.

SUMMARY

While the above procedure for allocating resources provides an advantageous utilization of the resources, it may result in security issues when resources are shared in the system. Having a shared cache layer among a set of processing units as described above, occasionally leads to PUs running different applications, accessing data from the same portion of the cache, such as a slice of an LLC, making the system vulnerable to security attacks.

It has further been appreciated that the above slice selection process does not consider differences in access time between PUs and LLC slices, e.g., due to different physical distance between a PU and different LLC slices.

An object of embodiments herein is to solve or at least alleviate, at least some of the problems described above.

According to a first aspect, there is provided a method for controlling memory handling in a processing system comprising a cache shared between a plurality of processing units, wherein the cache comprises a plurality of cache portions. The method comprises obtaining first information pertaining to an allocation of a first memory portion of a memory to a first application, an allocation of a first processing unit of the plurality of processing units to the first application, and an association between a first cache portion of the plurality of cache portions and the first processing unit. The method further comprises reconfiguring a mapping configuration based on the obtained first information, and further comprises controlling a providing of first data associated with the first application to the first cache portion from the first memory portion using the reconfigured mapping configuration.

According to a second aspect, there is provided a device for controlling memory handling in a processing system comprising a cache shared between a plurality of processing units, wherein the cache comprises a plurality of cache portions. The device is configured to obtain first information pertaining to an allocation of a first memory portion of a memory to a first application, an allocation of a first processing unit of the plurality of processing units to the first application, and an association between a first cache portion of the plurality of cache portions and the first processing unit. The device is further configured to reconfigure a mapping configuration based on the obtained first information, and further configured to control a providing of first data associated with the first application to the first cache portion from the first memory portion using the reconfigured mapping configuration.

According to a third aspect, there is provided a computer program comprising instructions which, when executed by at least one processor causes the at least one processor to perform the method of the first aspect.

According to a fourth aspect, there is provided a computer program product comprising a computer-readable medium having stored there on a computer program according to the third aspect.

Embodiments herein provide methods and devices to reduce vulnerability to security attacks in a processing system with shared resources.

Embodiments herein provide methods and devices to use resources in a more efficient manner.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

The technology disclosed herein relate to methods and devices suitable for controlling the memory handling in a processing system including a processor comprising several processing units, or so called "cores", and the processor is therefore generally referred to as a multi-core processor. Processing unit, PU, and core is used interchangeably herein. An application running in such a multi-core processing system may make use of more than one of the cores to enhance the speed of execution of its program code, if the program is adapted to such parallel computing of the instructions contained therein. As mentioned above, the processing system's memory resources are most often arranged in a memory hierarchy, ranging from small volume, but fast memory, easily accessible to the processing units, to large volume storage which is significantly slower and with long access times to data and instructions stored therein.

Figure 1:
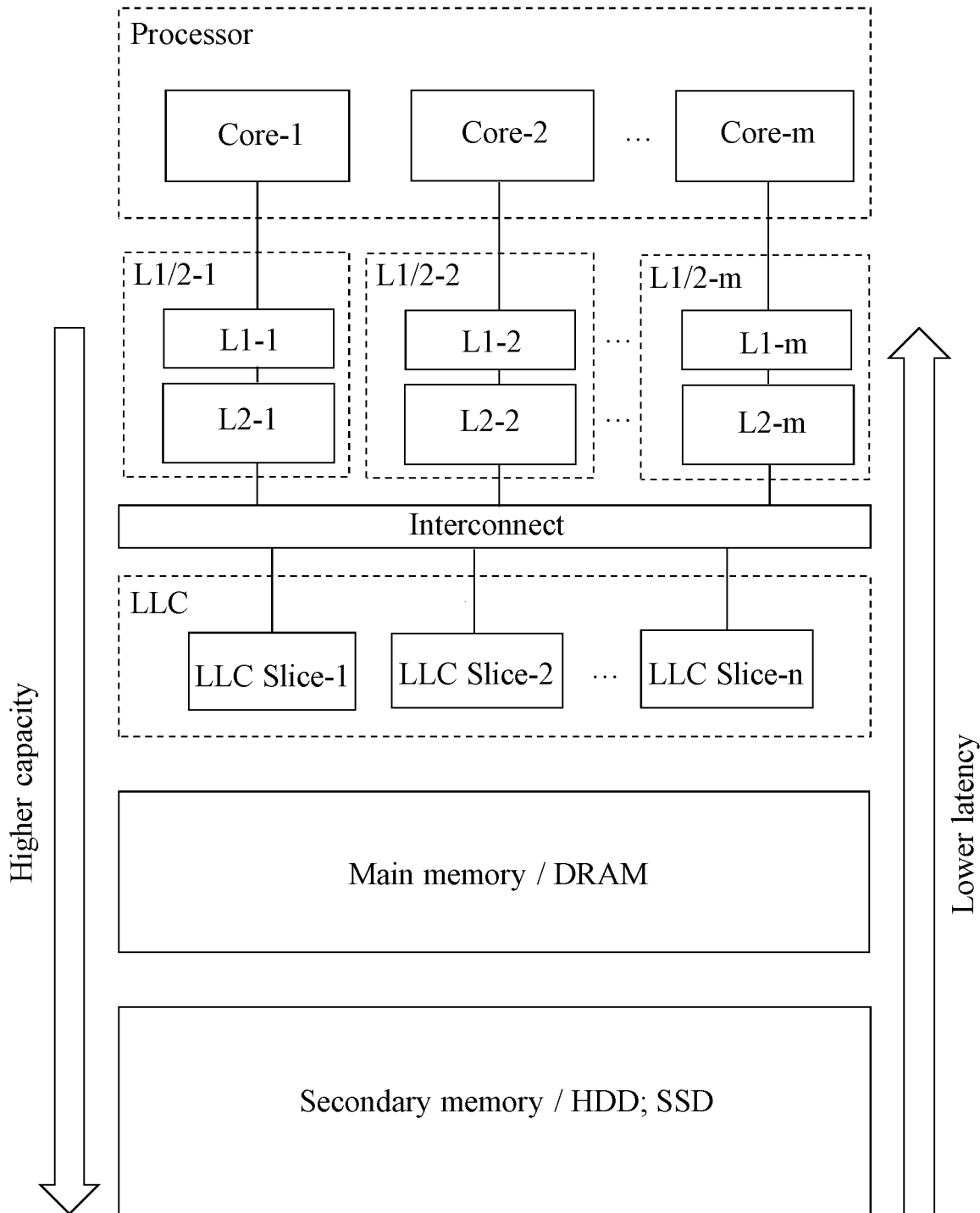
FIG. 1 is a schematic block diagram illustrating a multi-core processing system.

FIG. 1 illustrates schematically an exemplary multi-core processing system where embodiments herein may be applied. The processing system includes a processor being a multi-core processor, comprising a number of processing units, in this example comprising Core-1, Core-2, and up to a number of m cores, hence the collection of cores ending with Core-m. FIG. 1 further schematically illustrates a memory hierarchy as previously described. In this example, the system has a three layered cache structure comprising Layer 1 and Layer 2 caches which are private to the individual cores, i.e., not shared with the other cores of the processor, hence Core-1 is connected to the L1 cache and the L2 cache of the structure L1/2-1, Core-2 is connected to the L1 cache and L2 cache of L1/2-2, etc., up to Core-m, thus being connected to the L1 cache and the L2 cache of L1/2-m. Further illustrated is the slicing of a shared cache layer, in this example being the L3 cache of the cache structure, and may also be denoted the Last Level Cache (LLC), as it is the highest layer in the three-layer cache structure. Herein after the shared cache is referred to as the cache or the shared cache. The cache comprises LLC Slice-1, LLC Slice-2, etc., up to n LLC slices, i.e. LLC Slice-n. The slices of the cache are accessible to all the cores via an interconnect (e.g., ring bus or mesh), and as mentioned, the slices are shared between the m cores. Notably, m and n may have the same value or different values. The number of slices may, e.g., exceed the number of cores of the processor.

Below the layered cache structure is what is generally called the main memory, comprising a comparatively large volume of volatile memory, herein after referred to as the memory. The memory hierarchy in this example ends with the secondary memory, which in general may comprise one or more Hard Disc Drives (HDDs) and/or Solid-State Drives (SSDs), and thus being a non-volatile memory type. FIG. 1 further indicates a relative latency for accessing data and instruction of the different levels in the memory hierarchy.

Figure 2:
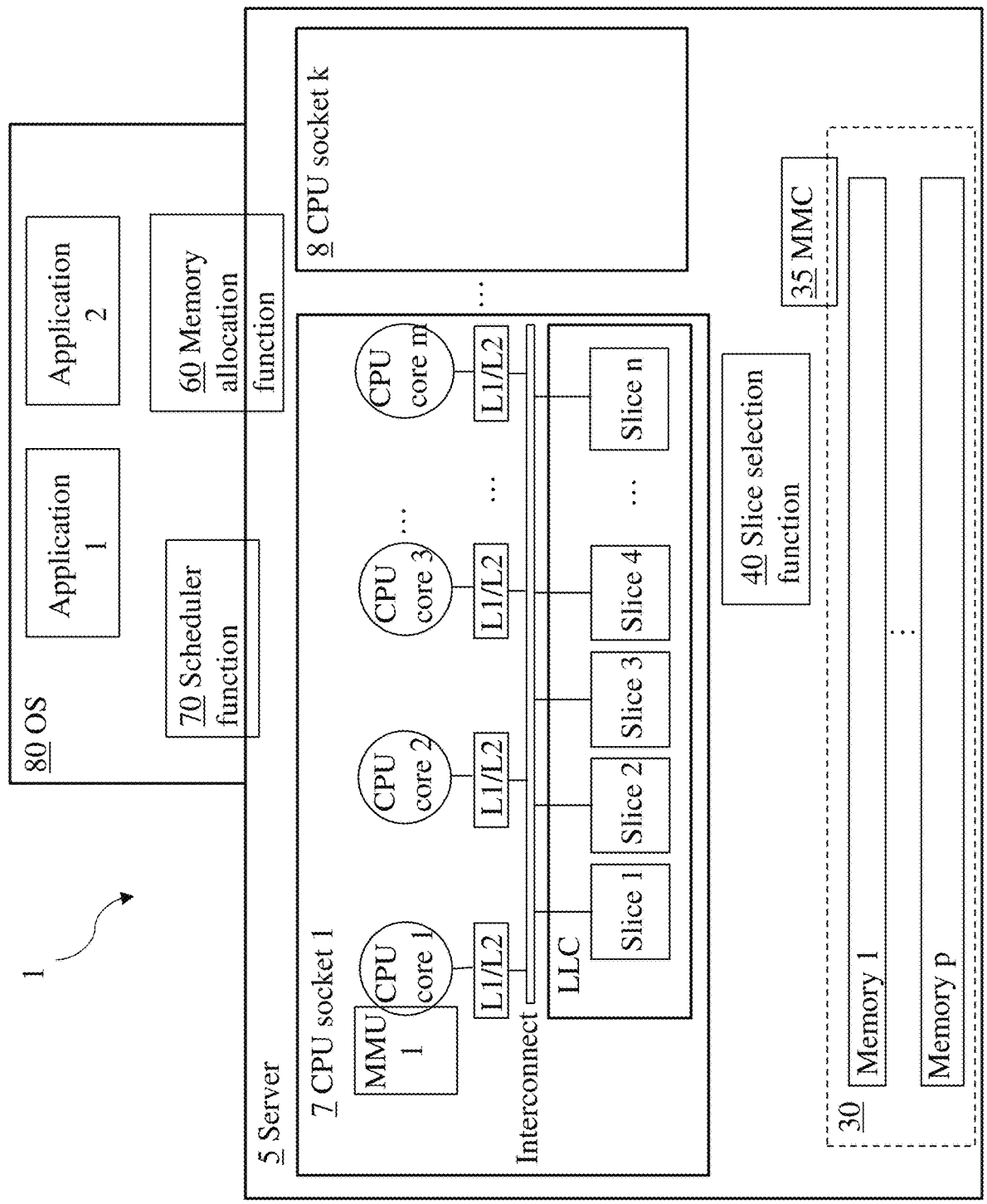
FIG. 2 is a schematic block diagram illustrating components of a multi-core processing system.

FIG. 2 illustrates schematically the components of an exemplary processing system 1 where embodiments herein may be applied. A server 5 build includes a number of CPU sockets 7; 8 and main memory 30, which may be mainly DRAM. The CPU sockets 7 compromise a number of cores: CPU core 1, CPU core 2, . . . CPU core m. Each core has dedicated L1 cache and L2 cache. All cores in the CPU socket 7 share a last level cache, LLC, which is accessed via an interconnect (e.g., a ring bus or mesh). The LLC includes different slices: Slice 1, Slice 2, . . . , Slice n. The memory management unit (MMU) is in charge of translating the virtual memory address into the physical memory address. The Slice selection function 40 is responsible for mapping the different portions of the memory 30 to the different slices. The memory 30 may be divided into several physical or logical parts, memory 1, . . . , memory p. The operation system (OS) 80 runs on a server 5 that can host different applications; Application 1, Application 2, etc. The applications can be pinned to only use one core in the system, but can be moved, i.e., migrated from one core to another if decided by the system. An application may also run on several cores as described above. The scheduler function 70 is responsible to decide which core each application should run on. The Memory allocation function 60 is an entity that is responsible for allocating memory from available physical memory to an application upon application requests. The memory management controller (MMC) 35 is a management entity that can provide information such as the memory situation, layout, etc.

As noted above there is a need to improve the processing systems with regards to vulnerability to security attacks. There is also a need to consider access times between PUs and cache slices.

It has been appreciated that, due to the differences in, e.g., physical distance between a processing unit and different portions of the shared cache, for instance different LLC slices, the accessing time for fetching data from the cache portions may differ. Thus, depending on to which cache portion the needed data is loaded, i.e., copied from the memory, the time for fetching the data may be shorter or longer for a specific core. Obtaining information on the difference in access time may be used to optimize the system.

The time required for a processing unit to fetch data from a specific cache portion may be determined by measurements. Thus, the access times between a PU and one or more of the cache portions may be determined. Such measurements may also be performed for multiple, or even all PUs in the processing system. As an example, the measurements may be conducted at start-up of the system. Alternatively, or additionally, such measurements may be performed at a certain point(s) or intervals of an up-and-running processing system. An association between a processing unit and a cache portion may hence be created or determined, for example, by a procedure comprising performing access time measurements.

It may further be noted that an association between a processing unit and a cache portion may change during run-time. As an example, the association may change in a scenario wherein a first LLC slice and a second LLC slice are both preferable for core 1. At some point the first LLC slice is associated to core 1. Assume that for another core, e.g., core 2, the only preferable LLC slice is also the first LLC slice. In a situation when core 2, e.g., starts running a high priority application, e.g., data related to the application must be accessed at a high rate, then core 1's association to the first LLC slice may change to the second LLC slice and instead core 2 is associated with the first LLC slice.

In some systems, a portion, e.g., a block, of the memory is allocated to an application, which may also be a process, at the initialization time and is later expanded by allocating more memory if needed. However, it is difficult to optimize such systems when the behavior of the application changes at runtime, for example when it migrates from one core to another core.

Figure 3:
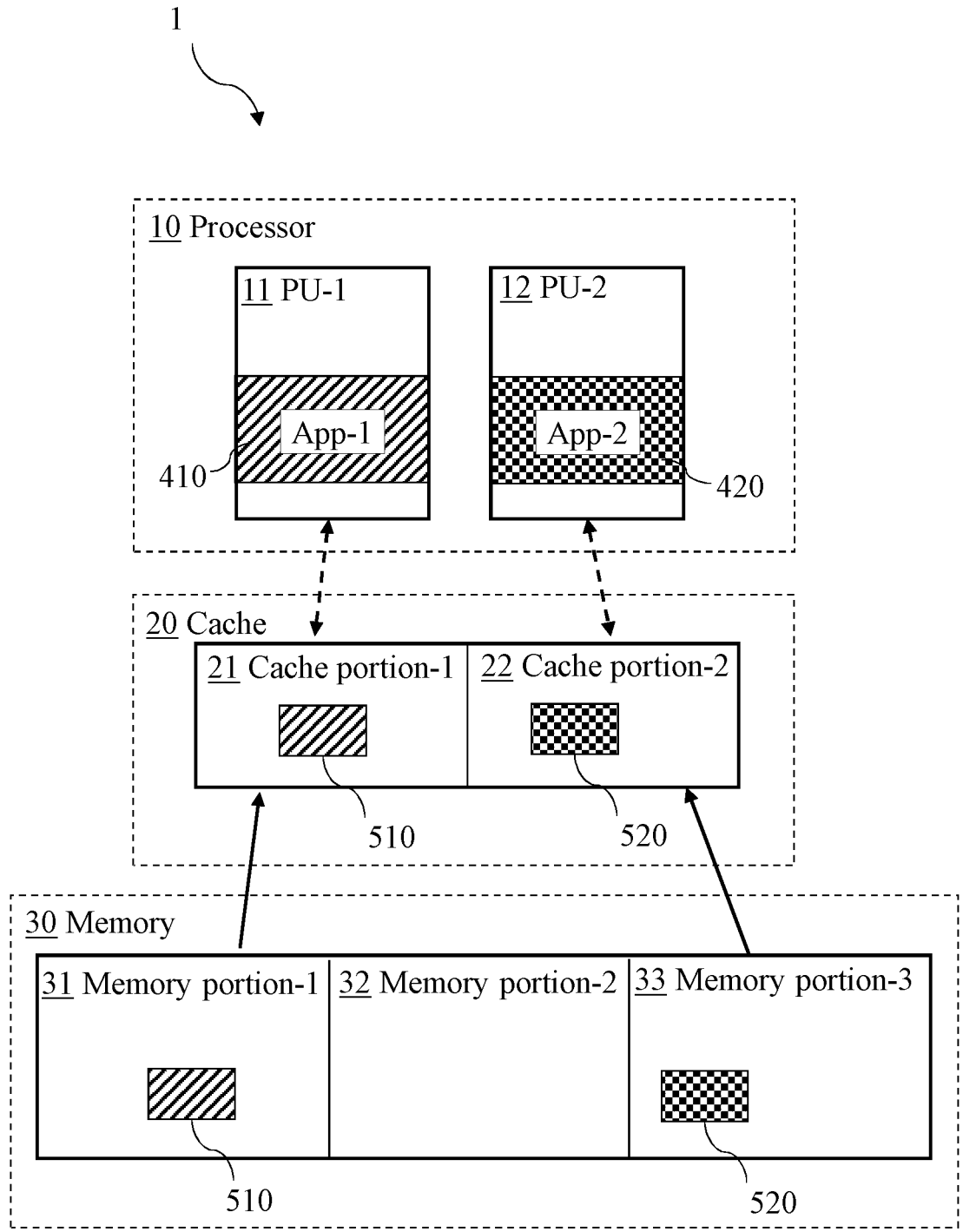
FIG. 3 is a schematic block diagram illustrating a processing system according to embodiments herein.

FIG. 3 shows schematically an exemplary and simplified processing system for illustrating some aspects of the technology presented herein. The exemplary processing system 1 comprises a processor 10 comprising a first processing unit 11 and a second processing unit 12. The processing system further comprises a cache 20, which is common to the first processing unit 11 and the second processing unit 12. In other words, the cache 20 is shared between the first processing unit 11 and the second processing unit 12, hence both units may read and write data to the cache 20. The cache 20 also comprises a first cache portion 21 associated with the first processing unit 11 and a second cache portion 22 associated with the second processing unit 12. This association may for example mean that the first processing unit 11, at least primarily, fetches, i.e., reads, data and instructions for execution from the first cache portion 21. In FIG. 3 this association is illustrated by a dashed arrow between cache portion-1 21 and PU-1 11. Similarly, a dashed arrow indicates the association between cache portion-2 22 and PU-2 12. The memory 30 of the processing system 1 comprises memory portion-1 31, memory portion-2 32, and memory portion-3 33. Schematically illustrated is that a first application 410 is running on the PU-1 11, and further illustrates that first data 510, required by the PU-1 11 for executing the program of App-1 410, has been copied from memory portion-1 31 in memory 30 to the first cache portion 21, indicated by the arrow. Similarly, the figure illustrates that a second application 420 is running on the PU-2 12, and that second data 520, required by the PU-2 12 for executing the program of App-2 420, has been copied from memory portion-3 33 in memory 30 to the second cache portion 22. The latter arrows thus suggest that a selection procedure is used for selecting which cache portion a data is copied to from the memory.

In this context, data also includes, e.g., instructions or other data necessary for running the application on the processing unit and may thus be included in the first data 510 and second data 520.

A cache portion as used herein, refers to a part of the cache 20, for example one or more LLC slices, however, not necessarily adjacent to each other.

Figure 4A:
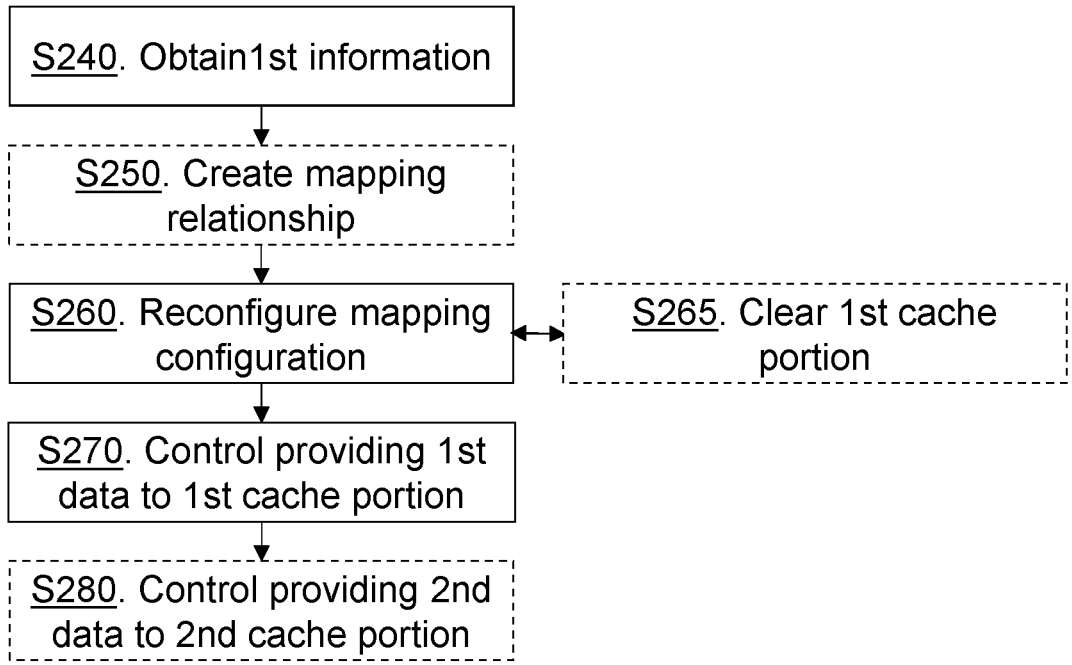
FIGS. 4*a* and 4*b* are flowcharts of methods according to embodiments herein.
Figure 4B:
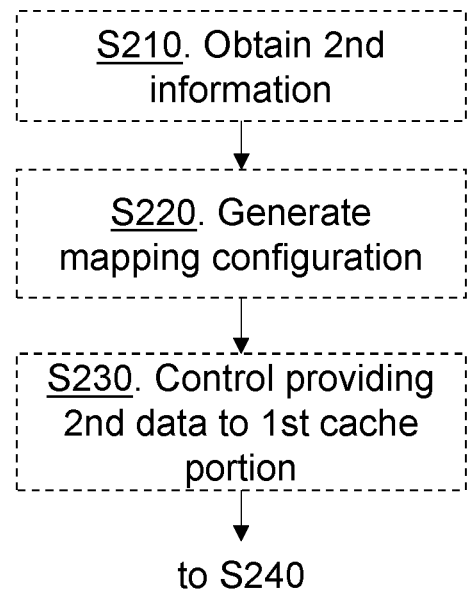

FIG. 4a and FIG. 4b show methods in accordance with embodiments herein and will now be explained with further reference to FIG. 3. Turning first to FIG. 4a, a method for controlling memory handling in a processing system 1 is described. The processing system 1 comprises a cache 20 shared between a plurality of processing units and the cache 20 comprises a plurality of cache portions. The method comprises obtaining S240 first information pertaining to an allocation of a first memory portion 31 of a memory 30 to a first application 410, an allocation of a first processing unit 11 of the plurality of processing units to the first application 410, and an association between a first cache portion 21 of the plurality of cache portions and the first processing unit 11. The method also comprises reconfiguring S260 a mapping configuration based on the obtained S240 first information, and the method further comprises controlling S270 a providing of first data 510 associated with the first application 410 to the first cache portion 21 from the first memory portion 31 using the reconfigured mapping configuration.

The controlling S270 may as an example include providing the mapping configuration, or specific information contained therein, to another entity performing the copying of data from the memory 10 to the cache 20. As an option, a device interacting with the processing system 1 may directly apply the mapping configuration for providing data to a selected cache portion.

The mapping configuration may for example comprise a set of rules for providing data stored in the memory 30 to the cache 20.

In some embodiments, the method may further comprise creating S250 a mapping relationship between the first memory portion 31 and the first cache portion 21 based on the obtained S240 first information. The reconfiguring S260 is based on the created S250 mapping relationship.

In some embodiments, as illustrated in FIG. 4b, the method may further comprise obtaining S210 second information pertaining to an allocation of a second memory portion 33 of the memory 30 to a second application 420, and an allocation of a second processing unit 12 of the plurality of processing units to the second application 420. The mapping configuration is in a further step generated S220 based on the obtained S210 second information. The method further comprises controlling S230 a providing of second data 520 associated with the second application 420 to the first cache portion 21 of the cache 20 from the second memory portion 33 using the generated S220 mapping configuration. The method may further include controlling S280 a providing of second data 520 associated with the second application 420 to a second cache portion 22 of the plurality of cache portions from the second memory portion 33 using the reconfigured S260 mapping configuration. Hence, by use of the reconfigured mapping configuration, data related to the second application will no longer be copied to first cache portion, but instead to the second cache portion. The first cache portion may in this way thus be made available to the first application. This may for example be due to that the first application has a higher priority than the second application, and less latency may be achieved for the first application by copying its requested data to the first cached rather than to, e.g., the second cache portion. Another reason may be that the reconfiguration provides an optimization of the system.

In some embodiments, the first processing unit 11 is allocated to a first Virtual Machine.

According to some embodiments, the second processing unit 12 is allocated to a second Virtual Machine.

According to some embodiments of the method, the reconfigured S260 mapping configuration provides an exclusive right for accessing one or more cache portions 21; 22 to at least one processing unit 11; 12. As an example, by providing such exclusive right, an application's priority may be ensured. Such exclusive right may alternatively or additionally be used to improve security between applications running on the different PUs, and/or between VMs to which one or more PUs have been allocated.

Furthermore, according to some embodiments, the reconfigured S260 mapping configuration provides an exclusive right for accessing at least the first cache portion 21 to the first processing unit 11.

The method may additionally in accordance with some embodiments comprise clearing S265 the first cache portion 21. By such clearing of the cache portion, it is further ensured that data is not intentionally shared between applications and/or VMs.

A device interacting with the processing system as described herein may be an integral part of the processing system. Alternatively, the device may be separated from the processing system and interact with entities or components of the processing system for controlling the memory handling of the processing system. The device may comprise one or more of a slice selection function and a slice selection function configuration manager as described herein.

According to some aspects herein, there is provided devices and methods for realizing a dynamic and programmable slice selection function and by this means, bringing extra flexibility for LLC aware data placement for a given process or application running on the system. According to some embodiments, an entity herein called slice selection function configuration manager is provided, which is responsible to configure a dynamic slice selection function.

Figure 5:
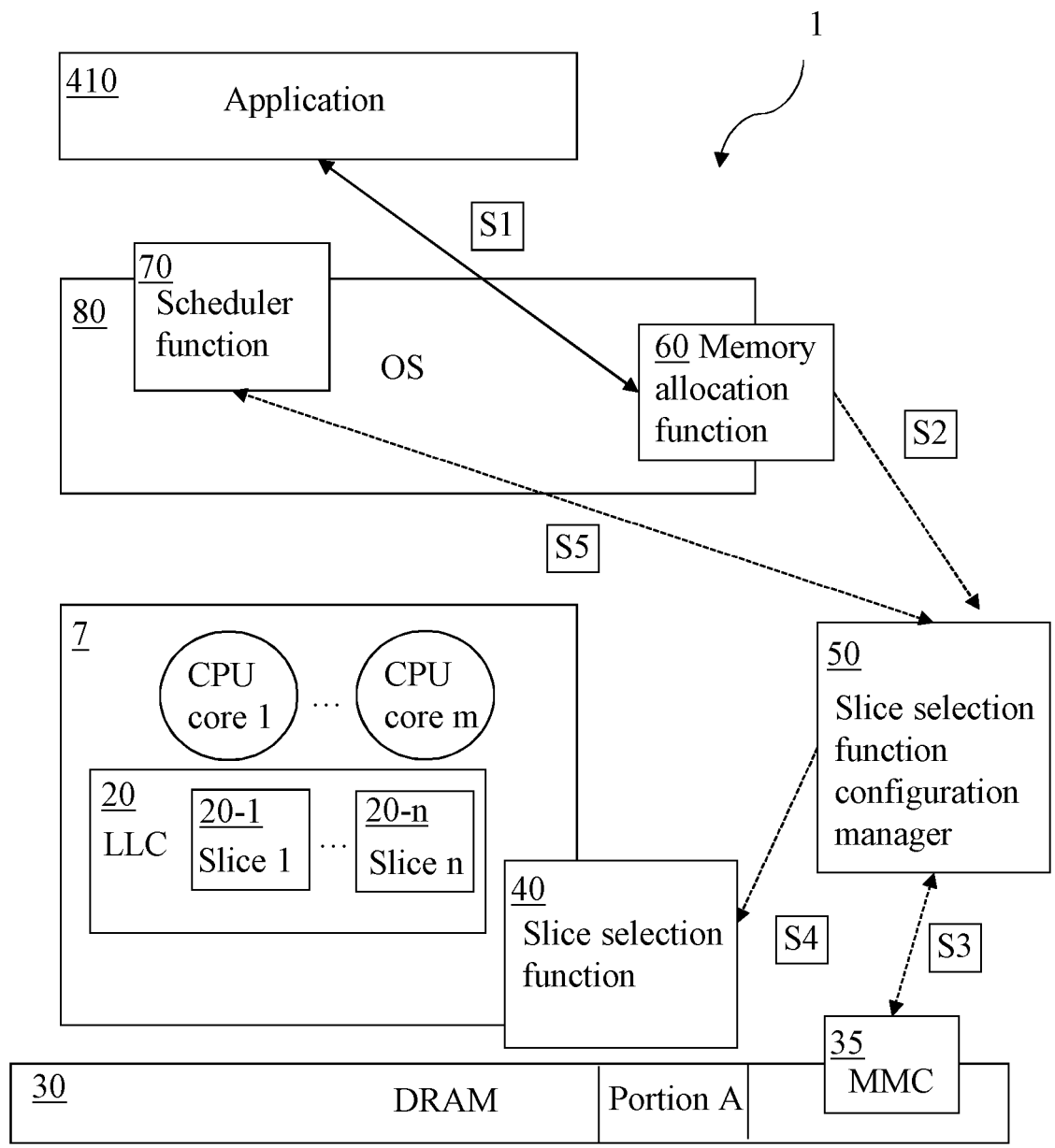
FIG. 5 shows a schematic block diagram illustrating a processing system and a method according to embodiments herein.

FIG. 5 illustrates schematically the components of an exemplary processing system and a device, and a method for controlling memory handling according to some aspects herein. A new entity or functionality, herein called a slice selection function configuration manager 50, is provided. This entity is responsible for managing and configuring the slice selection function 40 at runtime. Hence, the slice selection function 40 is thereby able to map the different portions of the memory, exemplified in FIG. 5 by DRAM 30, to different slices on-demand.

The slice selection function configuration manager function 50 can be implemented as a node in HW, e.g., a field-programmable gate array (FPGA) or in software, e.g., as part of the memory allocation function 60 of the OS 80, or partially in HW and partially in software.

As described above, the device may comprise one or more of a slice selection function and a slice selection function configuration manager as described herein. Exemplary methods will now be described, including interaction between components/functions, with reference to the schematic processing system shown in FIG. 5.

At an application initialization phase the following steps shown in FIG. 5 may be performed. As described above, the application 410 initially requests memory in order to be able to run on the system. This request will be handled by memory allocation function 60. The memory allocation function 60 reserves a memory from available physical memory in the system, step S1. In this example this assigned physical memory is referred to as Portion A of DRAM 30 in FIG. 5. The memory allocation function 60 can use different algorithms to find an appropriate portion from DRAM 30, e.g., a Buddy algorithm.

The memory allocation function 60 informs the slice selection function configuration manager 50 about this new assignment. This information includes, e.g., which portion of memory is assigned to which application and which core that application is running on. In this exemplary method it is assumed that the application is running on core 1. Such information can be provided by the memory allocation function 60 as shown in FIG. 5, step S2, but may be provided by another entity in the system.

Upon receiving the information from memory allocation function 60, the slice selection function configuration manager 50 decides how the assigned memory for a given application should be mapped to different LLC slice(s). The slice selection function configuration manager 50 might also consider other additional information, e.g., the information about the physical memory layout and contention on the physical interface between DRAM 30 and LLC 20 at its decision phase, which may be received from the MMC 35, step S3.

The slice selection function configuration manager 50 configures the dynamic slice selection function 40 so that the desired memory portion(s) may be mapped to the right LLC slice(s), step S4. In this exemplary method it is assumed that the slice selection function configuration manager 50 configures the dynamic slice selection function 40 to map the portion A from DRAM 30 to LLC Slice 1 20-1.

From this point when the application requests the access to its memory portion, the data will be loaded to the right LLC slice, in accordance to the above configuration. In this example, when the application requests the data from the portion A in DRAM 30, the data will thus be loaded to LLC slice 1 20-1.

Figure 6:
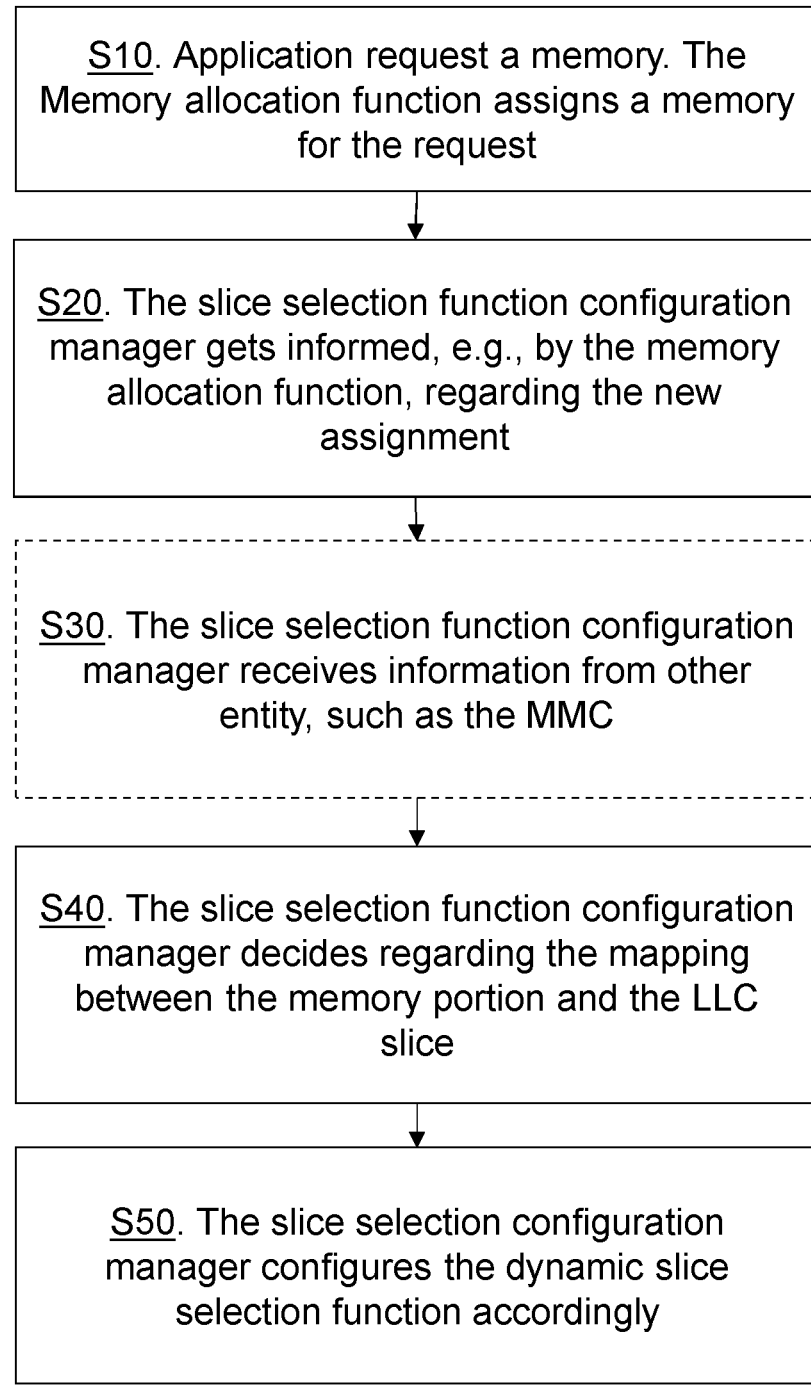
FIG. 6 is a flowchart of a method according to embodiments herein.

FIG. 6 shows a flowchart of an exemplary application initialization phase according to some embodiments herein and with further reference to FIG. 5.

S10: Application memory request. The memory allocation function 60 receives a request for memory from an application and the memory allocation function 60 assigns a memory portion to the application.

S20: Inform slice selection function configuration manager about memory assignment. The slice selection function configuration manager 50 gets informed about the new memory assignment to the application, e.g., by the memory allocation function 60.

S30: The slice selection function configuration manager 50 may optionally receive further information from another entity, e.g., information about the physical memory layout and contention on the physical interface between the memory 30 and the shared cache 20, such as from the MMC 35.

S40: The slice selection function configuration manager 50 decides on a mapping between the memory portion, and an LLC slice, e.g. Portion A and Slice 1, based on the received information.

S50: The slice selection function configuration manager 50 configures the slice selection function 40 in accordance with the mapping from S40.

The above example illustrates how the providing of data to a cache portion from a memory portion may be controlled.

As described above, the mapping configuration is a means for controlling the providing of data to a cache portion from a memory portion, for example comprising a set of rules for providing data stored in the memory 30 to the cache 20.

For reasons described herein, the mapping configuration may not remain static. Starting a new application on the processing system may require a new mapping between a memory portion and a cache portion as shown in the previous example. The mapping, and hence the mapping configuration, may be reconfigured for other reasons, such as a need for optimization of a system's performance during runtime, application(s) obtaining a new, higher or lower, priority, or for security reasons, etc.

Referring again to FIG. 5, the following example describes an optimization in runtime. This example thus focuses on how an optimization and adjusting of the memory mapping can be performed in runtime. Consider the previous example wherein the Portion A from DRAM is mapped to LLC slice 1. During runtime, the application which is using the Portion A from physical memory might move from core 1 to, for example, core number m. In this case, the previous mapping between Portion A in DRAM and LLC slice 1 is not valid anymore.

In this scenario, the slice selection function configuration manager 50 gets informed regarding the new setup, i.e., the given application being moved to new core. This information may be provided by a scheduler function 70, step S5, or another entity in the processing system 1.

The slice selection function configuration manager 50 might also consider other additional information, e.g., information about the physical memory layout and contention on the physical interface between DRAM and LLC, optional step S3. Finally, the slice selection function configuration manager 50 decides and configures the slice selection function 40 so that the desired memory portion(s) be mapped to right LLC slice(s), e.g., Portion A of DRAM is mapped to LLC Slice n, step S4.

Figure 7:
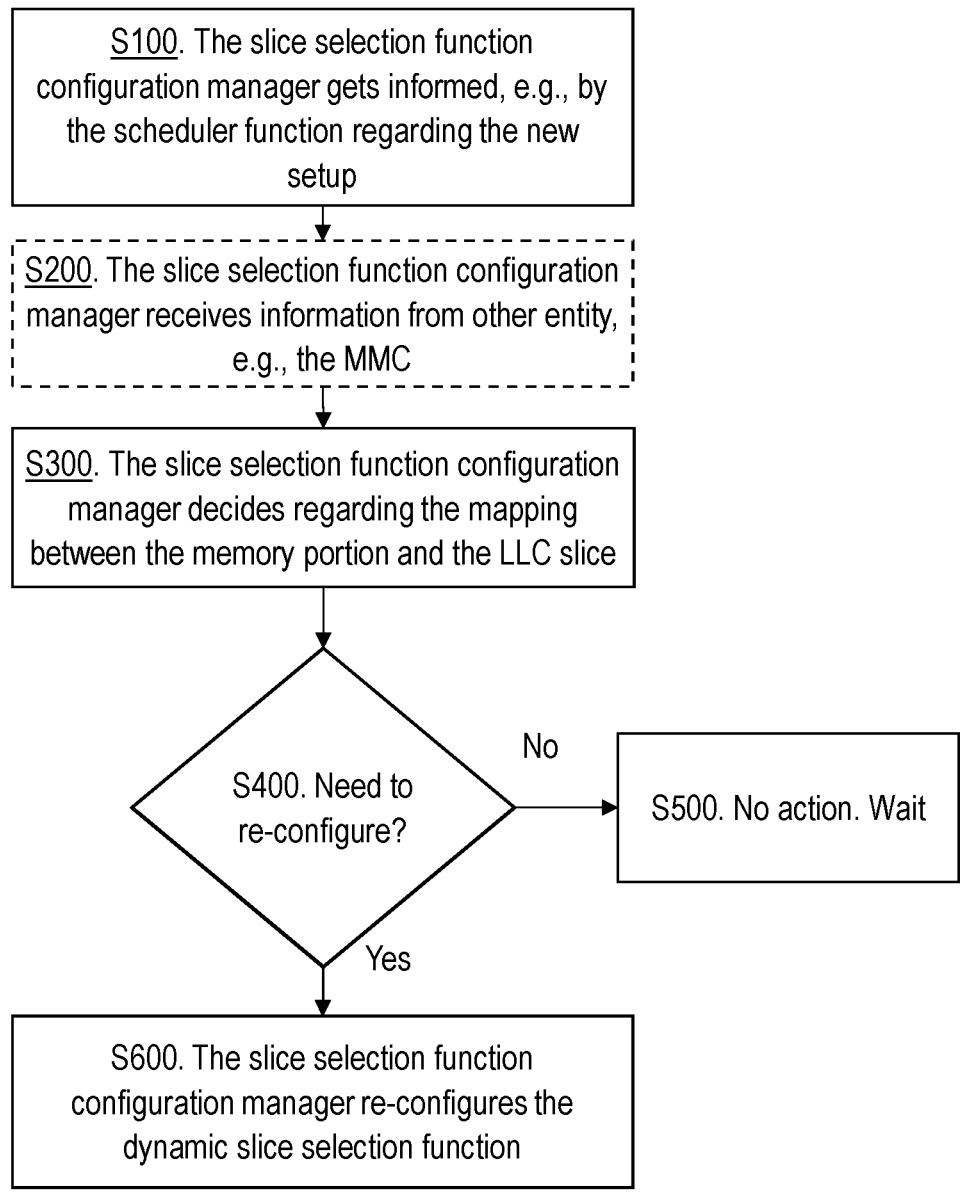
FIG. 7 is a flowchart of a method according to embodiments herein.

FIG. 7 shows a flowchart of an exemplary runtime optimization. Further reference is made to FIG. 5.

S100: The slice selection function configuration manager 50 is informed about a new setup, e.g., that the given application being moved to different core. This information may be received from the scheduler function 70.

S200: As an option, the slice selection function configuration manager 50 may receive further information from another entity, e.g., the MMC 35.

S300: The slice selection function configuration manager 50 decides on a mapping between the memory portion and an LLC slice based on the received information. Hence the mapping configuration may need to be reconfigured based on the received information.

S400: At this point it is evaluated if a reconfiguration is needed. If it is needed the process continues at S600. Otherwise it stops at step S500.

S500: No further action. Wait

S600: The slice selection function configuration manager 50 reconfigures the dynamic slice selection function.

Hence the providing of data to the cache portion from the memory portion can be controlled.

Figure 8:
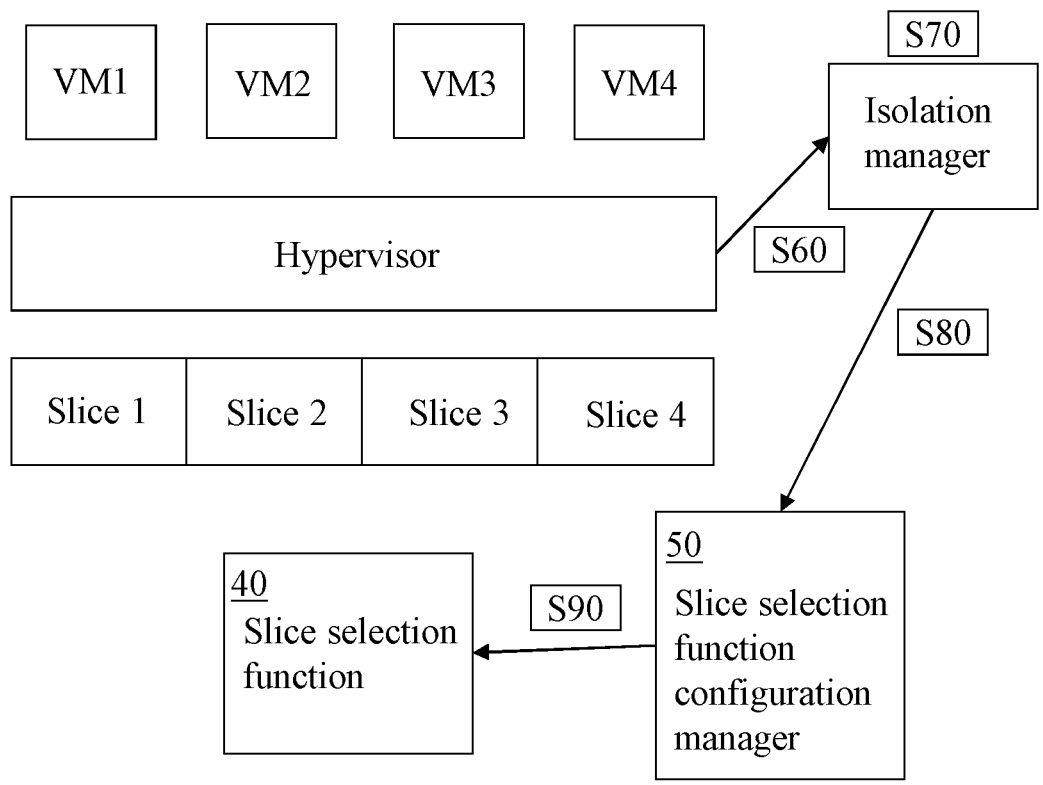
FIG. 8 is a schematic block diagram illustrating a processing system and a method according to embodiments herein.

FIG. 8 illustrates schematically the components of an exemplary processing system and a device, and a method according to some embodiments herein, useful for providing isolation between entities in the system.

In order to use physical resources more efficiently, nowadays, most of the IT industries are relying on virtualized environments and they are deploying their services on top of the third-party cloud providers. For doing so, cloud providers use firmware or software known as Hypervisor or virtual machine monitor (VMM) to manage physical resources and support multi-tenancy. However, using shared physical resources introduces unexpected security challenges, which can become problematic for security-critical applications. There have been many efforts to tackle these challenges by restricting VM access to unprivileged resources such as DRAM and disks, but having a shared resource, the shared cache, at the heart of CPU can still make virtualized environments vulnerable to cache attacks such as Meltdown and Spectre.

There is thus provided an embodiment for virtualized environments to mitigate cache attacks by fully isolating Virtual Machines (VMs) in the cache level.

The embodiment comprises two primary entities:
1) The slice selection function configuration manager 50—which may be the same entity as described above.
2) A new entity herein called "Isolation manager" which ensures isolation in LLC among different virtual machines by limiting the access of each virtual machine to a subset of LLC slices.

FIG. 8 shows the structure of this solution. The isolation manager utilizes the slice selection function configuration manager 50 as previously described herein.

The isolation manager may be implemented either in software, e.g., as a part of hypervisor, or in hardware, e.g., FPGA, or partially in HW and partially in software. The responsibilities of this entity include but not limited to:
1. Getting configuration of different VMs—e.g., size of memory for each VM, physical memory addresses assigned to a VM, if VM requires isolation—from the hypervisor or another entity in the system, step S60.
2. Making the decision about the way that different VMs should be isolated. For example, two VMs might need to have a shared LLC slice so that they could communicate with each other through this shared channel, step S70.
3. Informing the slice selection function configuration manager 50 about its decision, step S80, so that slice selection function configuration manager 50 may apply this decision to dynamic slice selection function 40, step S90.

4. Keeping track of configuration changes over time—optimizing the system configuration at runtime.

By performing the mentioned tasks, the isolation manager can thus restrict the access of VMs to only one or a few LLC slices. By doing so, the LLC can become a private resource for VMs, which can improve the security by fully isolating VMs in the cache level.

Figure 9:
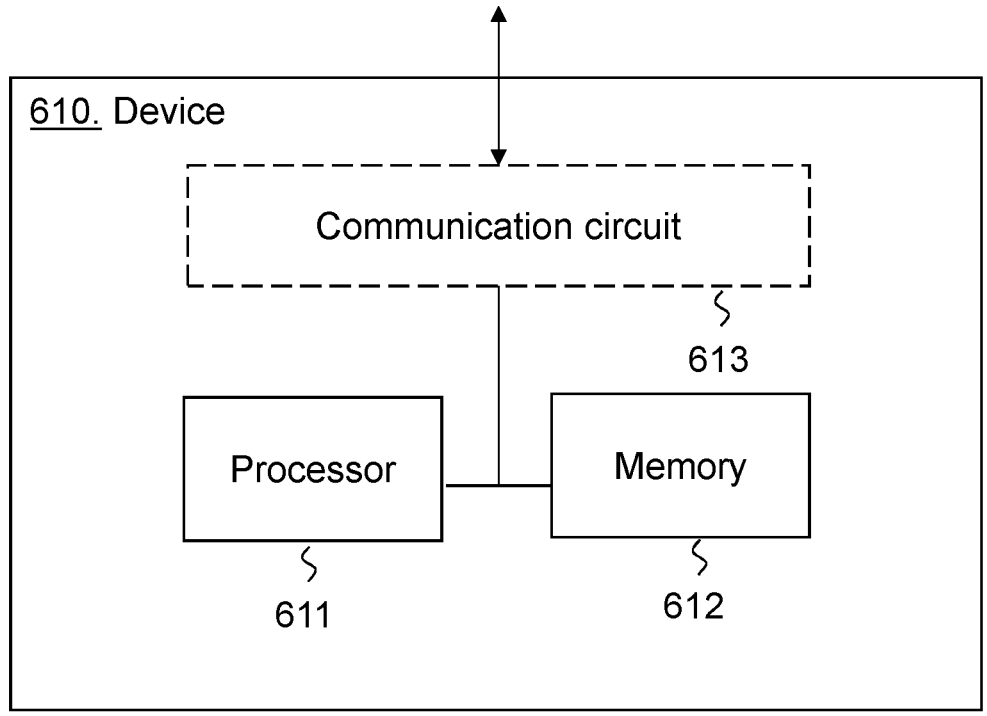
FIG. 9 is a schematic block diagram illustrating a device according to embodiments herein.

FIG. 9 is a schematic block diagram illustrating an example of a device 610 based on a processor-memory. In this particular example, the device 610 comprises a processor 611 and a memory 612, the memory 612 comprising instructions executable by the processor 611, whereby the processor is operative perform steps of the methods as described herein.

Optionally, the device 610 may also include a communication circuit 613. The communication circuit 613 may include functions for wired and/or wireless communication with other devices and/or systems, e.g., in a network. In a particular example, the communication circuit 613 may be based on circuitry for communication with one or more other nodes/devices, including transmitting and/or receiving information. The communication circuit 613 may be interconnected to the processor 611 and/or memory 612. By way of example, the communication circuit 613 may include any of the following: a receiver, a transmitter, a transceiver, input/output (I/O) circuitry, input port(s) and/or output port(s).

Figure 10:
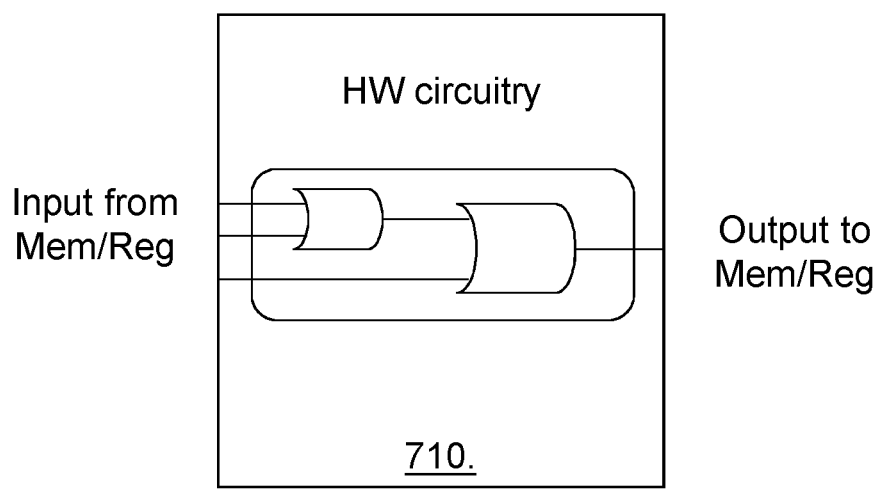
FIG. 10 is a schematic block diagram illustrating a device according to embodiments herein.

FIG. 10 is a schematic block diagram illustrating another example of a device 710 based on a hardware circuitry implementation according to an embodiment. Examples of suitable hardware (HW) circuitry include one or more suitably configured or possibly reconfigurable electronic circuitry, e.g. Application Specific Integrated Circuits (ASICs), Field Programmable Gate Arrays (FPGAs), or any other hardware logic such as circuits based on discrete logic gates and/or flip-flops interconnected to perform specialized functions in connection with suitable registers (Reg), and/or memory units (Mem).

Figure 11:
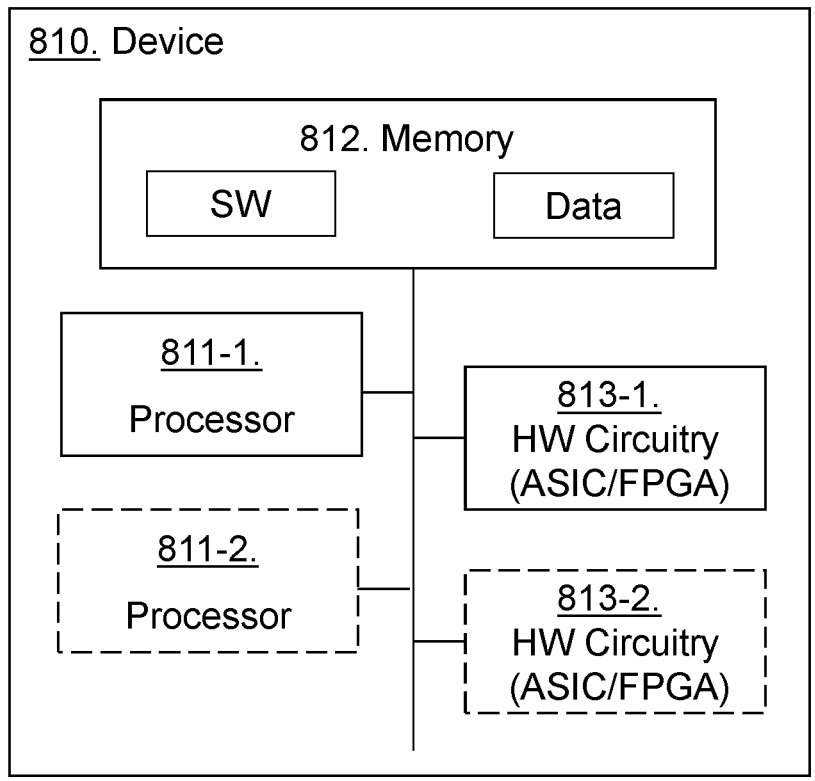
FIG. 11 is a schematic block diagram illustrating a device according to embodiments herein.

FIG. 11 is a schematic block diagram illustrating yet another example of a device 810, based on combination of both processor(s) 811-1, 811-2 and hardware circuitry 813-1, 813-2 in connection with suitable memory unit(s) 182. The device 810 comprises one or more processors 811-1, 811-2, memory 812 including storage for software and data, and one or more units of hardware circuitry 813-1, 813-2 such as ASICs and/or FPGAs. The overall functionality is thus partitioned between programmed software (SW) for execution on one or more processors 811-1, 811-2, and one or more pre-configured or possibly reconfigurable hardware circuits 813-1, 813-2 such as ASICs and/or FPGAs. The actual hardware-software partitioning can be decided by a system designer based on a number of factors including processing speed, cost of implementation and other requirements.

Alternatively, or as a complement, at least some of the steps, functions, procedures, modules and/or blocks described herein may be implemented in software such as a computer program for execution by suitable processing circuitry such as one or more processors or processing units.

The flow diagram or diagrams presented herein may therefore be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

Figure 12:
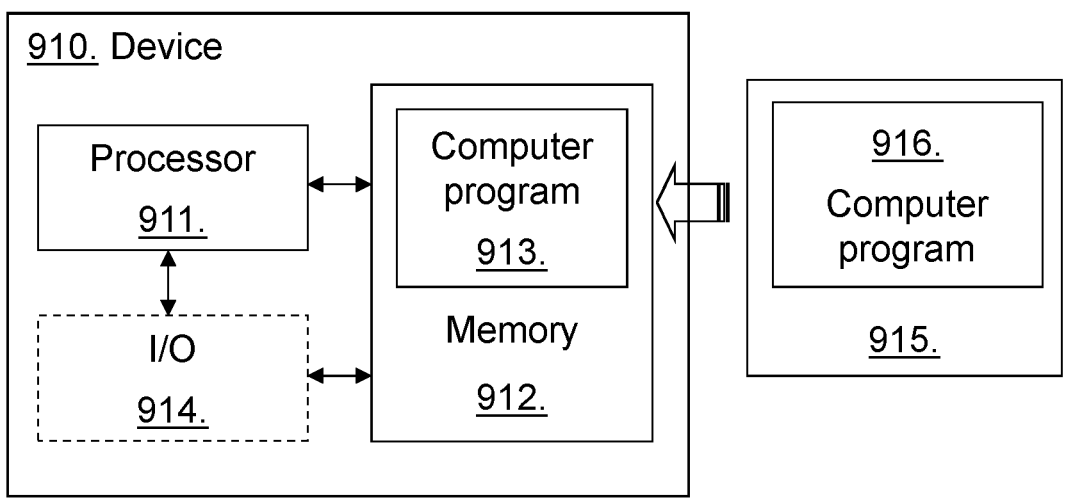
FIG. 12 is a schematic block diagram illustrating a computer-implementation of a device according to embodiments herein.

FIG. 12 is a schematic diagram illustrating an example of a computer-implementation of a device 910, according to an embodiment. In this particular example, at least some of the steps, functions, procedures, modules and/or blocks described herein are implemented in a computer program 913; 916, which is loaded into the memory 912 for execution by processing circuitry including one or more processors 911. The processor(s) 911 and memory 912 are interconnected to each other to enable normal software execution. An optional input/output device 914 may also be interconnected to the processor(s) 911 and/or the memory 912 to enable input and/or output of relevant data such as input parameter(s) and/or resulting output parameter(s).

The processing circuitry including one or more processors 911 is thus configured to perform, when executing the computer program 913, well-defined processing tasks such as those described herein.

The term 'processor' should be interpreted in a general sense as any system or device capable of executing program code or computer program instructions to perform a particular processing, determining or computing task.

The processing circuitry does not have to be dedicated to only execute the above-described steps, functions, procedure and/or blocks, but may also execute other tasks.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

By way of example, the software or computer program 913; 916 may be realized as a computer program product, which is normally carried or stored on a computer-readable medium 912; 915, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

The invention claimed is:

1. A method for controlling memory handling in a processing system comprising a cache and a plurality of processing units, wherein the cache is a last level cache shared among the plurality of processing units and wherein the last level cache has a plurality of cache portions allocated respectively to corresponding processing units of the plurality of processing units, in which a first cache portion of the plurality of cache portions is allocated to a first processing unit of the plurality of processing units, the method comprising:
obtaining first information pertaining to:
an allocation of a first memory portion of a memory to a first application;
an allocation of the first processing unit of the plurality of processing units to the first application; and
an association between the first cache portion of the plurality of cache portions to the first memory portion and the first processing unit;
receiving information regarding transfer of the first application running on the first processing unit to another processing unit of the plurality of processing units;
determining whether a reconfiguration of a mapping configuration of the first memory portion to the first cache portion is required, based on the received information regarding the transfer of the first application running on the first processing unit to the other processing unit;
reconfiguring the mapping configuration of the first memory portion to a different cache portion from the first cache portion, based on a determination that a reconfiguration of the mapping configuration is required; but retaining the mapping configuration of the first memory portion to the first cache portion, based on a determination that the reconfiguration of the mapping configuration is not required; and
controlling transfer of first data associated with the first application between the first memory portion and the other processing unit via use of the different cache portion, when reconfiguration of the mapping configuration of the first memory portion to the different cache portion is required.

2. The method according to claim 1, wherein said mapping configuration comprises a set of rules for providing data stored in the memory to the cache.

3. The method according to claim 1 further comprising:
creating a mapping relationship between the first memory portion and the first cache portion based on the obtained first information, wherein said reconfiguring is based on the created mapping relationship.

4. The method according to claim 1 further comprising:
obtaining second information pertaining to:
an allocation of a second memory portion of the memory to a second application; and
an allocation of a second processing unit of the plurality of processing units to the second application;
generating a second mapping configuration based on the obtained second information; and
controlling providing of second data associated with the second application to the first cache portion from the second memory portion using the second mapping configuration.

5. The method according to claim 4 further comprising:
controlling a providing of second data associated with the second application to a second cache portion of the plurality of cache portions from the second memory portion using the second mapping configuration.

6. The method according to claim 4, wherein said first processing unit is allocated to a first Virtual Machine.

7. The method according to claim 6, wherein said second processing unit is allocated to a second Virtual Machine.

8. The method according to claim 1, wherein the mapping configuration provides an exclusive right for accessing the first cache portion.

9. The method according to claim 1, wherein the mapping configuration provides an exclusive right for accessing the first cache portion by the first processing unit.

10. A device for controlling memory handling in a processing system comprising a cache and a plurality of processing units, wherein the cache is a last level cache shared among the plurality of processing units and wherein the last level cache has a plurality of cache portions allocated respectively to corresponding processing units of the plurality of processing units, in which a first cache portion of the plurality of cache portions is allocated to a first processing unit of the plurality of processing units, the device configured to:
obtain first information pertaining to:
an allocation of a first memory portion of a memory to a first application;
an allocation of the first processing unit of the plurality of processing units to the first application; and
an association between the first cache portion of the plurality of cache portions to the first memory portion and the first processing unit;
receive information regarding transfer of the first application running on the first processing unit to another processing unit of the plurality of processing units;
determine whether a reconfiguration of a mapping configuration of the first memory portion to the first cache portion is required, based on the received information regarding the transfer of the first application running on the first processing unit to the other processing unit;
reconfigure the mapping configuration of the first memory portion to a different cache portion from the first cache portion, based on a determination that a reconfiguration of the mapping configuration is required; but retain the mapping configuration of the first memory portion to the first cache portion, based on a determination that the reconfiguration of the mapping configuration is not required; and
control transfer of first data associated with the first application between the first memory portion and the other processing unit via use of the different cache portion, when reconfiguration of the mapping configuration of the first memory portion to the different cache portion is required.

11. The device according to claim 10, wherein said mapping configuration comprises a set of rules for providing data stored in the memory to the cache.

12. The device according to claim 10 further configured to:
create a mapping relationship between the first memory portion and the first cache portion based on the obtained first information, wherein said reconfiguring is based on the created mapping relationship.

13. The device according to claim 10 further configured to:
    obtain second information pertaining to:
        an allocation of a second memory portion of the memory to a second application; and
        an allocation of a second processing unit of the plurality of processing units to the second application;
    generate a second mapping configuration based on the obtained second information; and
    control providing of second data associated with the second application to the first cache portion from the second memory portion using the second mapping configuration.

14. The device according to claim 13 further configured to:
    control a providing of second data associated with the second application to a second cache portion of the plurality of cache portions from the second memory portion using the second mapping configuration.

15. The device according to claim 13, wherein said first processing unit is allocated to a first Virtual Machine.

16. The device according to claim 15, wherein said second processing unit is allocated to a second Virtual Machine.

17. The device according to claim 10, wherein the mapping configuration provides an exclusive right for accessing the first cache portion.

18. The device according to claim 10, wherein the mapping configuration provides an exclusive right for accessing the first cache portion by the first processing unit.

19. A non-transitory computer-readable storage medium comprising instructions which, when executed by at least one processor, cause the at least one processor to perform operations for controlling memory handling in a processing system comprising a cache and a plurality of processing units, wherein the cache is a last level cache shared among the plurality of processing units and wherein the last level cache has a plurality of cache portions allocated respectively to corresponding processing units of the plurality of processing units, in which a first cache portion of the plurality of cache portions is allocated to a first processing unit of the plurality of processing units, comprising:
    obtaining first information pertaining to:
        an allocation of a first memory portion of a memory to a first application;
        an allocation of a first processing unit of the plurality of processing units to the first application; and
        an association between a first cache portion of the plurality of cache portions to the first memory portion and the first processing unit;
    receiving information regarding transfer of the first application running on the first processing unit to another processing unit of the plurality of processing units;
    determining whether a reconfiguration of a mapping configuration of the first memory portion to the first cache portion is required, based on the received information regarding the transfer of the first application running on the first processing unit to the other processing unit;
    reconfiguring the mapping configuration of the first memory portion to a different cache portion from the first cache portion, based on a determination that a reconfiguration of the mapping configuration is required; but retaining the mapping configuration of the first memory portion to the first cache portion, based on a determination that the reconfiguration of the mapping configuration is not required; and
    controlling transfer of first data associated with the first application between the first memory portion and the other processing unit via use of the different cache portion, when reconfiguration of the mapping configuration of the first memory portion to the different cache portion is required.

* * * * *